United States Patent
DuBell et al.

[11] 3,736,746
[45] June 5, 1973

[54] RECIRCULATING ANNULAR SLOT FUEL/AIR CARBURETING SYSTEM FOR GAS TURBINE COMBUSTORS

[75] Inventors: Thomas L. DuBell; Jack R. Taylor, both of Cincinnati, Ohio

[73] Assignee: General Electric Company

[22] Filed: Aug. 13, 1971

[21] Appl. No.: 171,639

[52] U.S. Cl. ............................ 60/39.36, 60/39.74 R
[51] Int. Cl. ............................................... F02c 3/24
[58] Field of Search ................ 60/39.65, 39.74 R, 60/39.36

[56] References Cited
UNITED STATES PATENTS

| | | | |
|---|---|---|---|
| 2,698,050 | 12/1954 | Bloomer | 60/39.74 R |
| 3,430,443 | 3/1969 | Richardson | 60/39.65 |
| 3,570,242 | 3/1971 | Leonardi | 60/39.74 R |
| 3,605,405 | 9/1971 | DuBell | 60/39.65 |

*Primary Examiner*—Douglas Hart
*Attorney*—Derek P. Lawrence, Thomas J. Bird and Lee H. Sachs

[57] ABSTRACT

A combustion system for a gas turbine engine is equipped with a fuel carbureting device which delivers a uniform fuel/air mixture to the primary combustion zone through a continuous annular exit slot. Fuel and air are provided as a continuous tangential flow to an annular premixing chamber, which is configured so as to provide a throat, a diffuser zone, and the annular exit slot. Radial swirl vanes are positioned within the premixing chamber to turn the fuel/air mixture axially, and counterswirl vanes surround the exit slot to provide additional primary combustion air to rapidly mix with the fuel/air mixture and to provide flame stabilization regions around the entire annular combustion chamber. Recirculation of the hot gases in the primary combustion zone is achieved by providing a diffuser zone upstream of the exit slot with a bluff body splitter for radially turning the fuel/air mixture.

13 Claims, 6 Drawing Figures

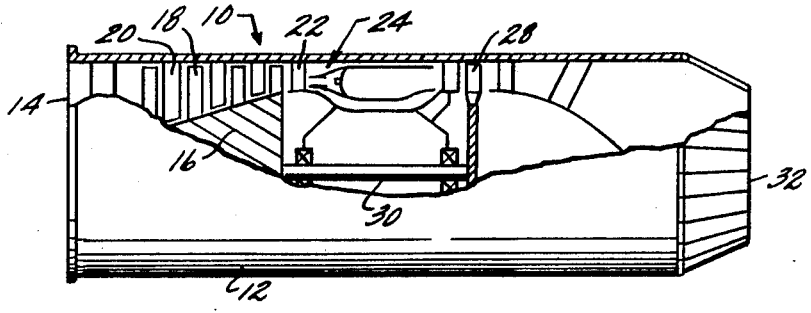
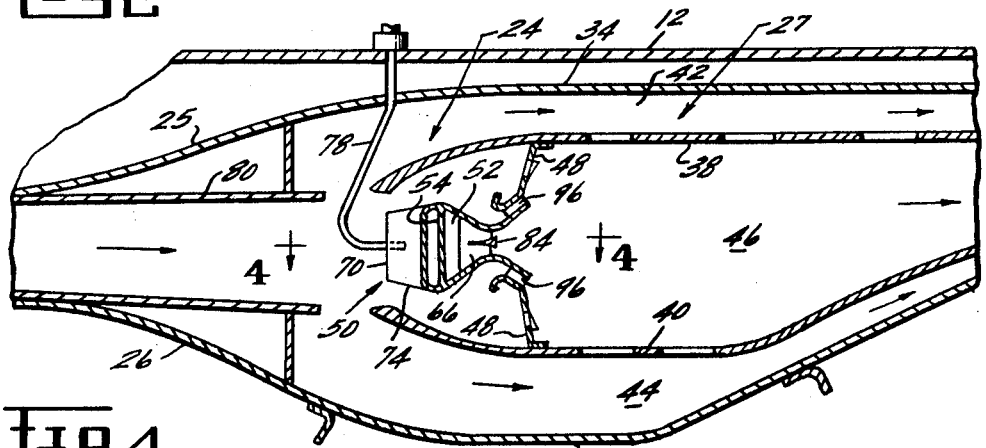
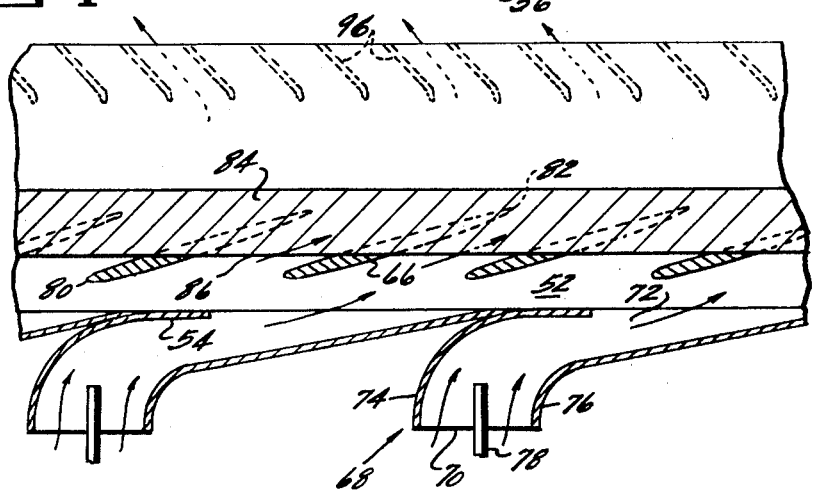
INVENTORS.
THOMAS L. DuBELL
JACK R. TAYLOR

INVENTORS
THOMAS L. DUBELL
JACK R. TAYLOR

3,736,746

RECIRCULATING ANNULAR SLOT FUEL/AIR CARBURETING SYSTEM FOR GAS TURBINE COMBUSTORS

BACKGROUND OF THE INVENTION

This invention relates generally to gas turbine engine combustion systems and, more particularly, to an improved annular slot type fuel/air carbureting system for an annular combustor. The invention herein described was made in the course of or under a contract, or a subcontract thereunder, with the United States Department of the Air Force.

Gas turbine engine manufacturers are continually searching for methods and means whereby a more efficient engine may be built. One natural attempt at increasing the efficiency is to increase the operating temperature of the engine. As a result of this, many advanced engine applications will operate with combustor exit temperatures of 2,500° F and higher. At these temperature levels, precise control of the exit temperature pattern, both radially and circumferentially, is of major importance. Precisely controlled temperature distributions are essential to minimize adverse temperature gradients and to eliminate potential hot spots in the combustor liners and turbine nozzle vanes.

In addition to improved efficiency, another important requirement for combustors for advanced engine applications is that smoke emission and pollutants be reduced to the lowest possible levels. In order to achieve such reductions, it is necessary to achieve nearly "stoichiometric" burning conditions within the combustion zone. This, in turn, requires nearly uniform temperature patterns throughout the combustion zone.

The above problems have resulted in numerous carbureting combustor design concepts, in which fuel is premixed with a portion of the combustor air flow prior to the combustion process in order to achieve complete intermixing of fuel and air prior to the burning process. This type of design has been found to provide compact, short length devices with well controlled exit temperature distribution. Many combustion systems of this type are designed to operate with simple, low pressure fuel injectors in place of the previously used atomizing spray nozzles. In systems of this type, the kinetic energy of the combustor air flow is used to atomize the fuel. One type of such a design which is becoming popular is known as the scroll or swirl cup design. In addition to providing shorter combustion systems, the scroll cup design has also resulted in very low gas smoke emission.

Each swirl cup is a discrete identity. Therefore, the fuel/air ratio distribution and the gas temperatures around the combustor annulus tend to be non-uniform in such a design. The non-uniform temperatures do not present unsolvable problems at present gas turbine operating temperatures, but as the gas temperature increases, this problem can become more severe. Localized streaks of high temperature gases are, in some cases, observable downstream of each of the swirl cups. Circumferential temperatures and fuel/air ratio variations of this type can result in localized hot spots and severe temperature gradients in the hot parts of the engine located downstream of the swirl cups.

It was for the above reasons that an annular slot fuel/air carbureting system, shown in an application entitled "Annular Slot Combustor" Ser. No. 103,604, invented by D. Bahr and D. Harshman and assigned to the same assignee as the present application, was developed.

As shown in the Bahr et al. application, the annular slot fuel/air carbureting system includes an annular premixing chamber which is located immediately upstream of the primary combustion zone. Fuel is mixed within the chamber with a portion of the combustion air flow and the resulting mixture is introduced into the primary combustion zone through a continuous annular slot. Air is introduced into the premixing chamber by means of a number of air intakes located around the annulus; and fuel is introduced into each of these intakes by means of suitable fuel injectors. The fuel and air mixture created within the air intakes is turned approximately 90° and discharged into the premixing chamber. A plurality of swirl vanes are located around the premixing chamber to direct the resulting fuel/air mixture into the primary combustion zone through the continuous annular slot. Additional primary combustion air flow is introduced into the primary combustion zone by means of rings of counterswirl vanes located concentrically around the annular slot. The counter air flow sets up a high shear region which provides effective and rapid mixing of the fuel/air mixture emitting from the premixing chamber with the additional primary combustion air.

Designs constructed in accordance with the above have proven to be quite effective in eliminating local hot spots and severe temperature gradients in the hot parts located downstream of the combustion chamber. That is, such designs have provided a uniform temperature profile in both the circumferential and radial directions around the annular combustor. Such designs are subject to one shortcoming, however, in that at low inlet temperatures the combustor stability (lean blowout) could be improved. Combustor stability is defined in part by the minimum fuel/air ratio at which a combustor will operate. This fuel/air ratio must be sufficiently low so that engines can be started without over temperature and so that engines can be decelerated from a high power setting to a low power setting without flameout. A problem typical of most previous combustion systems designed for high temperature rise has been achievement of satisfactory lean blowout fuel/air ratios at low inlet temperatures. This problem was solved in the past by increasing the number of fuel injection points over that used in conventional systems or, alternatively, by locally enriching the fuel/air ratio by staging fuel injection.

One of the objects of the annular fuel injecting system, however, was to deliver high temperature rises in a combustion system with a conventional or reduced number of fuel injection points. The reasons for this are obvious in that added fuel injection points result in added weight and a more complex system. The staging fuel injection systems are undesirable for similar reasons.

SUMMARY OF THE INVENTION

It is an object of the present invention, therefore, to provide an improved, highly stable annular fuel/air carbureting system having a relatively small number of fuel injection points and requiring no staging of fuel injection.

Briefly stated, the above object is attained by providing an annular slot carbureting system similar to that shown in the Bahr et al. application with means for recirculating the hot gases in the center of the gas stream. The recirculation is accomplished by providing the fuel and air mixture emanating from the annular slot with a radial velocity component. In one embodiment these means comprise a "trumpet" exit having a pair of radially directed walls which define a diverging annular channel and which constitute the inner bounds of the counterswirl vanes. In an alternative embodiment, the trumpet exit is augmented by means of a bluff body flow splitter installed within the throat of the annular slot exit and designed to cooperate with the trumpet exit to provide recirculating flow for the hot gases in the center of the gas stream. The improved design retains the mixing zone between the inner slot exit and the counterswirl vanes which provides for rapid and complete atomization of the flow particles as described in the Bahr et al. application.

DESCRIPTION OF THE DRAWINGS

While the specification concludes with a series of claims which distinctly claim and particularly point out the subject matter which applicants consider to be their invention, an understanding of this invention will be gained from the following detailed description. This description is given in connection with the attached drawings in which:

FIG. 1 is a schematic view with portions deleted, of a gas turbine engine incorporating the subject invention;

FIG. 2 is an enlarged, axial cross-sectional view of a combustion system constructed in accordance with the present invention;

FIG. 4 is a sectional view taken along line 4—4 of FIG. 2;

DESCRIPTION OF A PREFERRED EMBODIMENT

Figure 3:
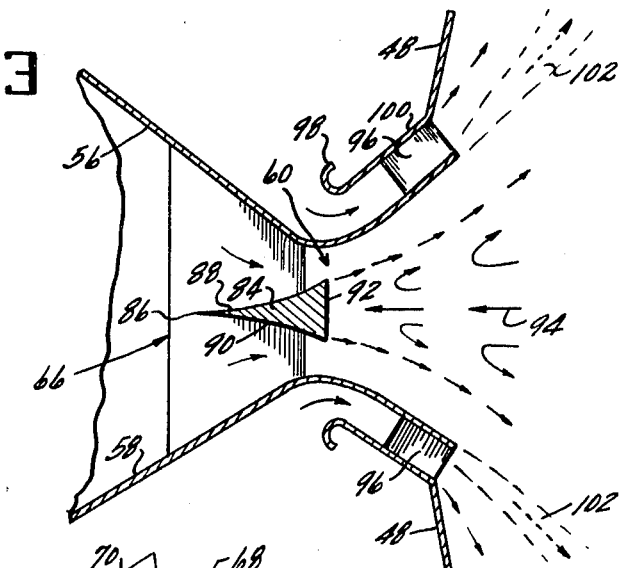
FIG. 3 is an enlarged portion of FIG. 2.

Referring to the drawings wherein like numerals correspond to like elements throughout, reference is initially directed to FIG. 1 wherein a gas turbine engine 10 includes a casing 12 forming an inlet 14, a compressor 16 having rows of rotor blades 18 interspersed between rows of stator vanes 20, which are affixed at their outer ends to the inner surface of the casing 12. At the downstream end of the compressor 16 is a row of compressor outlet guide vanes (OGVs) 22, followed by an annular diffuser passage or compressor discharge passage indicated generally at 24.

The compressor discharge passage or diffuser passage 24 includes a pair of concentric outer and inner walls 25 and 26, respectively divergent in a downstream direction as shown in FIG. 2. The diffuser passage 24 delivers the pressurized air from the compressor 16 into a combustor, indicated generally at 27, in which the pressurized air is mixed with high energy fuel and ignited to provide a hot gas stream at high velocity to a turbine 28. The turbine 28 extracts work from the hot gas stream to drive the compressor 16 by means of a connecting shaft 30 on which both components are mounted. The hot gas stream then leaves the engine through an exhaust nozzle 32 which may be of the adjustable area type.

The above description is intended to be merely descriptive of one type of gas turbine engine to which the improved combustion system may be applicable. As will become apparent from the following detailed description, the subject combustion system would be capable of use with any type gas turbine engine.

Referring to the enlarged view of FIG. 2, it will be seen that the combustor 27 includes an outer casing wall 34 and an inner casing wall 36 which are extensions of the diffuser walls 25 and 26, respectively. The outer and inner walls 34 and 36 are spaced from a pair of outer and inner combustion chamber liners, indicated at 38 and 40 respectively, and appropriately supported within the combustor. As thus described, the outer and inner combustor liners 38 and 40 cooperate with the outer and inner casing walls 34 and 36 to form three annular flow passages, an outer cooling passage 42, an inner cooling passage 44, and a primary combustion zone 46. The upstream end of the primary combustion zone 46 is clearly defined by means of a dome wall 48, which may be connected to the combustor liners 38 and 40 in any suitable manner.

Located immediately upstream of the dome wall 48, and connected thereto in any appropriate manner, is a fuel carbureting device 50 constructed in accordance with the present invention. As shown in FIGS. 2 through 5, the fuel carbureting device 50 includes an annular premixing chamber 52 formed of an upstream wall 54, an outer wall 56, and an inner wall 58. As shown most clearly in FIGS. 3 and 5, the outer wall 56 and the inner wall 58 initially converge as they extend axially from the upstream wall 54 to form an annular throat 60. In order to provide a radial velocity component to a fuel and air mixture which flows through the annular throat 60, the walls 56 and 58 thereafter diverge to form a diffuser zone 62 which terminates in an annular exit slot 64 formed by the downstream end of the walls 56 and 58. Positioned upstream of the throat 60 are a plurality of radially extending swirl vanes 66 equally spaced around the annulus and rigidly connected to the outer wall 56 and the inner wall 58 in any suitable manner.

As further shown in the drawings, the premixing chamber 52 is supplied with air by means of a number of air intakes 68, which are rigidly connected to and equally spaced around the upstream wall 54. The air intake 68 comprises a smoothly contoured inlet 70, an exit 72 positioned within the premixing chamber 52 and curved walls 74 and 76 which join the inlet 70 and the exit 72. As shown in FIGS. 2 and 3, each of the air intakes 68 is equipped with a suitable fuel injector 78, which in the present case comprises a simple, low pressure injection tube. As further shown in FIG. 2, the amount of compressor discharge air which is directed toward the air intake 68 can be controlled by appropriate sizing of an annular duct 80, which may be positioned within the walls 25 and 26 and connected thereto in any appropriate manner.

The curved walls 74 and 76 of the air intakes 68 are configured such that the fuel and air mixture created within the intakes is turned approximately 90° and is discharged into the premixing chamber 52 through the exit 72, in a generally tangential direction. Preferably, the upstream portion of the premixing chamber 52 and the discharge ends of the air intakes 68 are configured such that stagnation regions within the premixing chamber 52 between the air intakes 68 are eliminated.

That is, each of the curved walls 74 and 76 is configured such that the exits 72 of the air intakes 68 generally lie in a single plane as shown in FIG. 4. In this manner, a continuous tangential fuel and air mixture is introduced into the premixing chamber 52. As further shown in FIG. 4, leading edges 80 of the radial swirl vanes 66 are axially spaced on the exit planes of the air intakes 68. The resultant fuel and air mixture delivered into the premixing chamber 52 thus travels a certain distance around the perimeter of the chamber 52 prior to being affected by the radial swirl vanes 66. The actual distance traveled, and thus the lapsed time of the fuel/air mixture within the premixing chamber 52, is controlled by varying the axial spacing between the exit planes of the air intakes 68 and the leading edges 80 of the swirl vanes 66.

The radial swirl vanes 66 are of generally airfoil cross section with the trailing edges 82 lying at or near the plane of the throat 60 as shown in FIG. 2. The swirl vanes 66 are located in the premixing chamber 52 to return the fuel and air mixture from a primarily tangential flow direction to a more axial flow direction. The vanes 66 are positioned to provide nearly uniform velocity to the fuel and air mixture exiting the throat 60. That is, the vanes 66 are positioned and designed to provide an angle of attack to the fuel and air mixture such that little or no separation occurs across the length of the airfoil.

As shown in FIGS. 2 through 5, a bluff body flow splitter 84 is installed within the premixing chamber 52 approximately midway between the walls 74 and 76. The flow splitter 84 extends around the entire annulus and is held in place by means of a rigid connection to each of the vanes 66, such as by welding. As shown most clearly in FIGS. 3 and 5, the flow splitter 84 includes a leading edge 86, a pair of curved walls 88 and 90. The flow splitter 84 ends in a substantially vertical trailing wall 92. The walls 88 and 90 of the flow splitter 84 are designed to cooperate with the curved walls 56 and 58 and with the contour of the swirl vanes 66 to provide essentially constant flow area downstream of the throat of the swirl vanes 66. That is, the shape of the walls 88 and 90 is designed to offset the natural expansion between the vanes 66 downstream of the throat thereof to maintain the nearly uniform velocity of the fuel and air mixture from the throat 62 to the trailing wall 92 of the flow splitter 84. The radial convergence of the outer wall 56 and the inner wall 58 further aids the objective of providing flow of uniform velocity throughout at the exit plane of the premixing chamber 52. By providing such a uniform velocity flow, the possibility of flash back from the primary combustion zone 46 into the premixing chamber 52 is substantially eliminated. Such a flash back normally occurs if a low pressure region exists, because of variations in the flow, between the primary combustion zone and the fuel carbureting device. With the uniform velocity flow, however, the possibility of such a low pressure region is eliminated.

Figure 5:
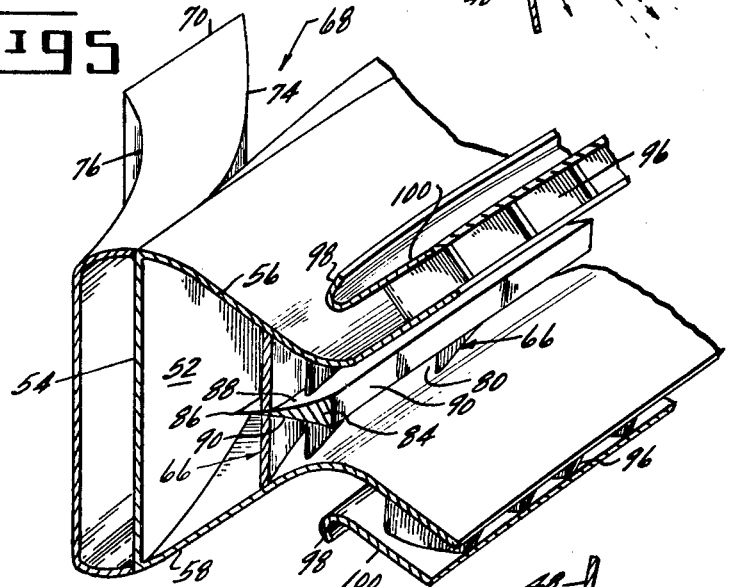
FIG. 5 is a perspective view of a portion of the combustion system of FIG. 2.

As most clearly shown in FIGS. 3 and 5, the fuel/air mixture discharges into the diffusion zone 62 formed by the outer wall 56 and the inner wall 58 downstream of the flow splitter 84. The centrally located flow separation which exists downstream of the flow splitter 84 is augmented in the diffusing passage, thus creating a much larger recirculating flow, as symbolized by arrows 94, than would normally exist for the amount of flow blockage provided by the flow splitter 84.

As further shown in FIGS. 2 through 5, additional primary combustion air flow is introduced into the primary combustion zone 46 by means of counterswirl vanes 96, which form a cascade externally of the outer wall 56 and the inner wall 58 at the ends thereof. Air is directed into the cascade of the counterswirl vanes 96 by means of bellmouth shaped walls 98 which cooperate with the exterior sides of the outer wall 56 and the inner wall 58 to form inlets to the cascades of counterswirl vanes 96.

Preferably, the additional primary combustion air flow is directed by the counterswirl vanes 96 in a circumferential flow direction counter to that of the fuel and air mixture issuing from the premixing chamber 56 as shown by arrows in FIG. 4. For this reason, the counterswirl vanes 96 are cambered and are provided with a curvature counter to that of the radial swirl vanes 66. Air enters the counterswirl vanes 96 through the bellmouth as mentioned above, and axial extensions of the bellmouth walls 98 form rings 100 to which the outer ends of the counterswirl vanes 96 may be rigidly connected. The inner ends of the counterswirl vanes 96, on the other hand, are rigidly connected to either the outer wall 56 or the inner wall 58.

The counter air flow emanating from the counterswirl vanes 96 provides regions of strong shear forces at the ends of both the outer wall 56 and the inner walls 58 and as shown by the shaded area 102. The strong shear effect on the fuel and air mixture provides for effective and rapid mixing of the fuel and air mixture from the premixing chamber 52 with the additional primary combustion air and also forms flame stabilization regions at the upstream end of the primary combustion zone 46.

In operation, a portion of the compressor discharge air from the diffuser passage 24 enters each of the air intakes 68 and is mixed with the fuel provided by the fuel injector 98. The resulting fuel and air mixture is turned approximately 90° and flows into the premixing chamber 52 as a continuous tangential flow. The fuel and air mixture travels a certain distance around the premixing chamber 52 before it is acted on by the radial swirl vanes 56 and directed through the throat 60. The fuel and air mixture is then divided by the flow splitter 84 and exits through the diffuser zone 62 into the primary combustion zone 46 with a slight radial velocity component.

Another portion of the compressor discharge air flows into the bellmouth 98 and through the counterswirl vanes 96 into the primary combustion zone 46. The interaction of this additional compressor discharge air flow with the fuel/air emanating from the diffuser zone 62 takes place in the high shear regions 102 immediately downstream of the outer wall 56 and the inner wall 58 as mentioned above.

The remainder of the compressor discharge air flows around the combustor liners 38 and 40 through the passageways 42 and 44 to cool the liners. A portion of this air enters the primary combustion zone 46 as secondary air through suitable openings in the combustor liners. The fuel and air mixture within the primary combustion zone 46 is then ignited by means of a suitable igniter (not shown), and the high energy gas stream thus formed exits the primary combustion zone and drives the turbine 28 in a well known manner.

As described above, the diffuser zone 62 and the positioning of the counterswirl vanes 96 provide a well defined strong recirculation zone of hot combustion gases which stabilizes the high dome flow/high temperature rise annular slot combustor over a range of fuel/air ratios and conditions which are equivalent to those enjoyed by conventional combustion systems. The innovations also act to improve the circumferential and radial distribution of fuel/air in the primary combustion zone 46 which allows attainment of design performance goals with fewer fuel injector points.

Figure 6:
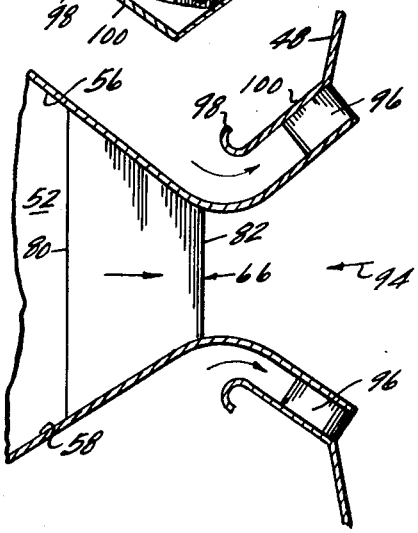
FIG. 6 is a perspective view, similar to FIG. 3, of an alternative embodiment in FIG. 2.

It should be obvious to one skilled in the art that certain changes can be made to the above-described fuel carbureting device without departing from the broad inventive concepts thereof. For example, in certain applications it may be possible to eliminate the flow splitter 84 and to attain the desired recirculation flow merely by use of a diffuser zone described by the contour of the outer wall 56 and the inner wall 58. Such a design is pictured as an alternative embodiment in FIG. 6. The embodiment shown therein is identical to that described above with the exception that the flow splitter 84 has been removed. The contour of the outer wall 56 and the inner wall 58 would change slightly in such a design in order to provide the uniform velocity flow of the fuel/air mixture through the throat 60 as described above in connection with the embodiment of FIGS. 2 through 5. In such a case the position and shape of the radial swirl vanes 66 would also probably be altered from that shown in FIGS. 2 through 5. It is intended that the appended claims cover these and all similar variations in applicants' broader inventive concept.

What we claim is:

1. In a fuel carbureting device of the type for use in a gas turbine engine which includes an annular combustion zone wherein a high energy gas stream is generated, said carbureting device including an annular premixing chamber having a continuous annular exit slot, said exit slot being substantially coaxial with said annular combustion zone, a plurality of swirl vanes positioned within said exit slot, means for delivering a fuel and air mixture to said premixing chamber as a tangential flow upstream of said swirl vanes and means for generating a counterswirl flow around said exit slot whereby a continuous annular fuel and air mixture is introduced into the combustion zone, the improvement comprising:
    means for providing said continuous annular fuel and air mixture with a radial velocity component as it flows through said annular exit slot.

2. The fuel carbureting device recited in claim 1 wherein said annular premixing chamber includes a generally radially extending upstream wall, an inner wall, and an outer wall, said inner and outer walls extending axially from said upstream wall and converging to form an annular throat section.

3. The fuel carbureting device recited in claim 2 wherein said means for providing the radial components comprises a diffuser zone located downstream of said annular throat.

4. The fuel carbureting device recited in claim 3 wherein said diffuser zone is formed by extensions of said inner and outer walls which diverge from said annular throat section.

5. The fuel carbureting device recited in claim 4 further including a bluff body flow splitter positioned within said throat section.

6. The fuel carbureting device recited in claim 5 wherein said flow splitter is supported by said swirl vanes.

7. The fuel carbureting device recited in claim 6 wherein said flow splitter, said swirl vanes, and said inner and outer walls cooperate to form a substantially constant flow area downstream of the throat portion of said swirl vanes.

8. The fuel carbureting device recited in claim 7 wherein said counterswirl flow generating means comprise cascades of counterswirl vanes connected to said inner and outer walls at or near the downstream ends thereof.

9. A fuel carbureting device as recited in claim 8 wherein said counterswirl vanes are positioned so as to deliver primary combustion air to the combustion zone in a direction counter that of said fuel and air mixture.

10. A gas turbine engine including a compressor for generating an annular gas stream, a turbine for driving said compressor, and a combustion system wherein high energy fuel is introduced into said annular gas stream and ignited to produce a high energy gas stream to drive the turbine, said combustion system including an annular combustion zone and a fuel carbureting device for delivering a fuel and air mixture to said combustion zone, said fuel carbureting device comprising:
    an annular premixing chamber having a continuous annular exit slot, said exit slot being substantially coaxial with said annular combustion zone;
    a plurality of swirl vanes positioned within said exit slot;
    means for delivering a fuel and air mixture to said premixing chamber as a tangential flow upstream of said swirl vanes;
    means for generating a counterswirl air flow around the exit slot whereby a continuous fuel and air mixture is introduced into the combustion zone; and
    means for providing said fuel and air mixture with radial velocity components as it passes through said exit slot.

11. A gas turbine engine as recited in claim 10 wherein said radial velocity component providing means includes a bluff body flow splitter positioned within said exit slot and a diffuser zone located downstream of said flow splitter.

12. A gas turbine engine as recited in claim 11 wherein said annular premixing chamber comprises a generally radially extending upstream wall, an inner wall and an outer wall extending axially from said upstream wall, said inner and outer walls converging to form a throat section and thereafter diverging toward said diffuser zone.

13. A gas turbine engine as recited in claim 12 wherein said means for generating a counterswirl air flow comprise a plurality of counterswirl vanes positioned around said diffuser zone.

* * * * *